Figure 1:
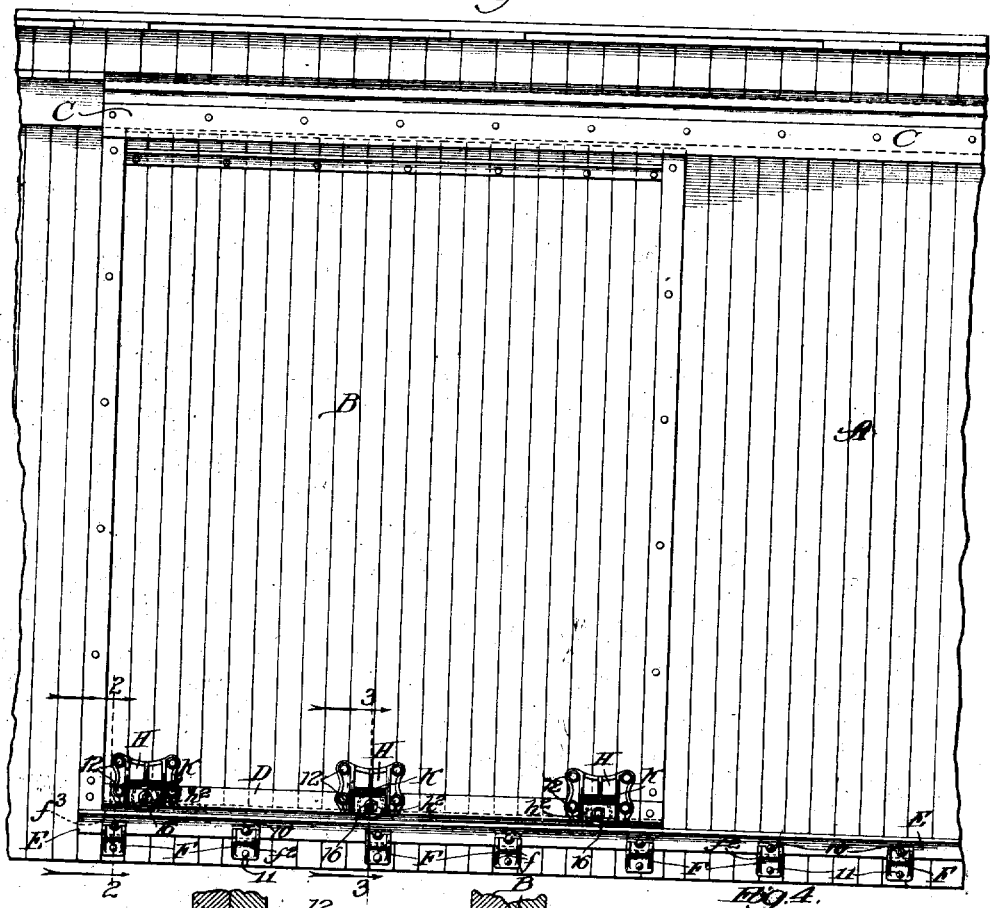

J. F. COMEE.

CAR DOOR HANGER.

APPLICATION FILED MAY 17, 1915.

Reissued June 15, 1915.

13,927.

Inventor:
Joseph F. Comee
By Rowe, Fisher & Ashley
Attys.

UNITED STATES PATENT OFFICE.

JOSEPH F. COMEE, OF CHICAGO, ILLINOIS, ASSIGNOR TO CAMEL COMPANY, OF CHICAGO, ILLINOIS, A CORPORATION OF MAINE.

CAR-DOOR HANGER.

13,927. Specification of Reissued Letters Patent. Reissued June 15, 1915.

Original No. 1,126,403, dated January 26, 1915, Serial No. 838,797. Application for reissue filed May 17, 1915. Serial No. 28,791.

*To all whom it may concern:*

Be it known that I, JOSEPH F. COMEE, a citizen of the United States, residing in the city of Chicago, county of Cook, and State of Illinois, have invented certain new and useful Improvements in Car-Door Hangers, of which I do declare the following to be a full, clear, and exact description, reference being had to the drawing forming a part of this specification.

The present invention has for its object to provide improved mechanism for supporting and guiding the sliding doors of freight cars, and the invention consists in the features of novelty hereinafter described, illustrated in the accompanying drawing and particularly pointed out in the claims at the end of this specification.

Figure 2:
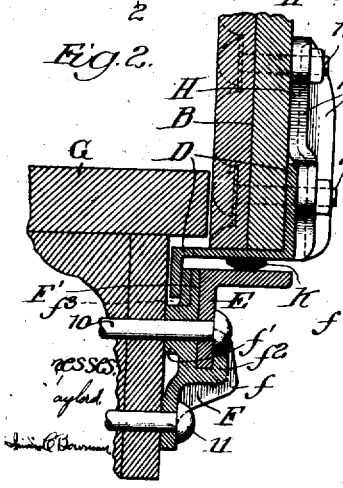
Figure 3:
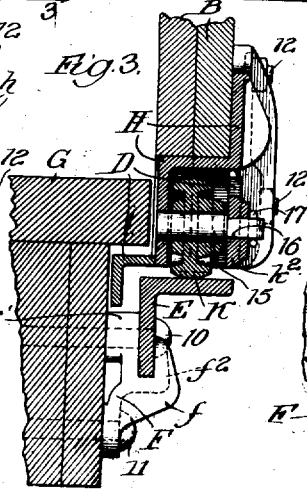
Figure 4:
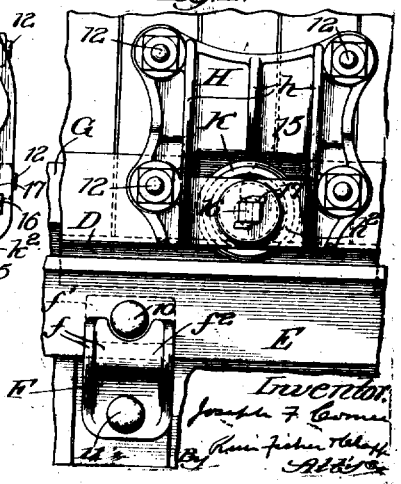

Figure 1 is a view in side elevation showing part of a freight car body equipped with a sliding door provided with my improved door-supporting and guide mechanism. Fig. 2 is an enlarged view in vertical section on line 2—2 of Fig. 1. Fig. 3 is an enlarged view in vertical section on line 3—3 of Fig. 1. Fig. 4 is an enlarged detail view in front elevation showing, more particularly, one of the roller brackets or casings and adjacent parts.

A designates the side wall of a freight car and B denotes the sliding door thereof. Above the top of the door B and fastened to the overhanging part of the car wall is an upper guide plate C that serves to prevent the outward movement of the upper part of the car door B. To the lower edge of the car door B is secured a Z-shaped bar D that extends from front to rear of the door. This Z-bar D has an upper member extending vertically along the lower portion of the door B and has a horizontal member extending beneath the edge of the door and an inner vertical member extending downwardly and inside the track bar E. In the present form of my invention, this track bar E consists of an angular guide. This track bar E is supported by brackets F which are arranged at convenient distances apart beneath and along the path of travel of the door B. Each of the brackets F is preferably formed as a metal casting having its body strengthened by upwardly projecting ribs $f$ and having an inwardly projecting or thickened portion or boss $f'$ extending toward and adapted to bear against the side wall of the car beneath the floor G thereof. Each of the brackets F is also formed with an outer vertically extending wall $f^2$ which forms, with the body of casting, a channel adapted to receive the lower member of the track bar E. Each of the castings is secured to the car body by means of through bolts 10 and 11, the through bolt 10 passing also through the lower, vertical member of the track bar E and serving to securely hold said track bar in place.

It will be observed that the shape of the casting F is such that the track bar E may be held at a sufficient distance from the wall of the car body beneath the floor G to enable the Z-bar D to move freely back and forth. It will be seen, also, that the horizontal member of the Z-bar D extends some distance inward beyond the outer edge of the floor G that projects through the door opening of the car, as by this construction the lower portion of the door-opening is better guarded against access of dust cinders, snow, etc., than if the floor G terminated in line with the vertical member of the Z-bar D. One of the brackets F located adjacent the left-hand side of the door-opening is formed with an upward extension F′ having a cam-shaped inner face $f^3$ adapted to contact with the depending inner member of the Z-bar D, so that as the door B is moved to closed position, the cam face of the upward extension F′ will force the door inward and thereby cause it to more tightly close the door opening of the car. Inasmuch as this upward extension F′ of the bracket bears against the vertical member of the track bar E, the outward strain upon such vertical extension is resisted by the track bar and the danger of breakage of the bracket is materially lessened.

I do not wish to be understood as claiming in the present application the construction of the bracket F, as this forms the subject-matter of a separate application filed by me of even date herewith.

To the lower portion of the door B are secured a series of roller supporting brackets, the preferred construction of which will next be described. Each of these brackets is shown as consisting of a chambered casting or casing H, the outer face of which is strengthened by ribs $h$ and each casting is connected to the door by means of through bolts 12. The chambered portion of each of the castings H which projects inward from the upper face of the casting, sets within a cutaway space or recess formed in the lower edge portion of the door B and in the Z-bar D. Within the chambered portion of each of the castings H is mounted a roller K adapted to travel upon the surface of the track bar E. Each roller K is mounted upon a pintle 15 that projects outwardly through the chambered portion of the casting and through the front wall or diaphragm $h^2$ that is formed as an integral part of the casting H. That portion of the pintle 15 that projects through the wall $h^2$ is preferably reduced, as at 16, and through the outer reduced end portion of the pintle is passed a cotter pin 17 that serves to securely hold the pintle in place.

Inasmuch as the chambered portion of each of the castings H extends beneath the door and is approximately equal to the thickness of the door, the casting takes up but very little room and affords a very firm and secure housing for the roller K. It will be understood, of course, that the pintles 15 that support the rollers K will be inserted through the holes in the inner walls of the castings H and the shouldered outer portion of the pintles will prevent their being withdrawn from the front, even if the cotter pins should be removed.

The sliding doors of freight cars being subjected to extremely severe strains in use, it is highly important that the door supporting rollers should be secured in the most effective and stable manner, and inasmuch as the castings H are carried within seats or cutaway spaces in the lower edge of the door and in the Z-bar D, they will be so firmly held as to guard against all danger of displacement under the severe strains of service.

It is obvious that the precise details of construction above set out may be varied without departing from the spirit of the invention and that features of the invention may be employed without its adoption as an entirety.

Having thus described my invention, what I claim as new and desire to secure by Letters Patent is—

1. In mechanism of the character described, the combination with a sliding door and with a track supported beneath said door, of a Z-bar attached to the lower edge of the car door, both said Z-bar and said car door having recesses formed therein, a plurality of casings arranged within said recesses of the car door and Z-bar, and a plurality of rollers within said casings and adapted to travel upon said track.

2. In mechanism of the character described, the combination with a sliding car door, with a track supported beneath said door, of a Z-bar attached to the lower edge of the car door, said Z-bar and said car door having recesses formed therein, a plurality of casings arranged within said recesses of the car door and Z-bar, said casings being provided at their front with flanges, bolts passing through said flanges and through the car door and Z-bar, and a plurality of rollers within said casings and adapted to travel upon said track.

3. In mechanism of the character described, the combination with a sliding door and with a track bar supported beneath said door, of a Z-shaped bar attached to the lower edge of the car door, the inner vertical member of said Z-bar depending inside said track, said car door having recesses formed therein at its lower edge, a plurality of casings arranged within said recesses of the car door, and a plurality of rollers within said casings and adapted to travel upon said track.

4. The combination with a car body having a door opening and a sliding door for said opening, of a track bar located beneath and in proximity to the bottom edge of said door and secured to and spaced from the side wall of the car, a Z-shaped member having a horizontal portion at the lower edge of the door, an inner vertical flange depending from said horizontal portion into the space behind said track bar and an outer vertical flange overlapping and bolted to the outer face of the door, and a plurality of rollers arranged in recesses in the lower edge of the door and extending downwardly below the horizontal portion of said Z-shaped member into engagement with said track bar.

5. The combination with a car body having a door opening, a floor portion projecting through said door opening beyond the side of the car and a sliding door the lower edge of which overlaps said projecting floor portion, of a track bar located beneath said door and secured to and spaced from the side of the car, a retaining member secured to the lower edge of the door and having a horizontal portion extending inwardly therefrom beneath said projecting floor portion and having an inner vertical flange depending into the space behind said track bar, said door having recesses in its lower edge, and casings provided with rollers mounted in said recesses, said rollers projecting downwardly below the horizontal portion of said retaining member into engagement with said track bar.

6. The combination with a car body having a door opening and a sliding door for said opening, of a track bar located beneath said door and secured to and spaced from the side of the car, a Z-shaped retaining member secured to the lower edge of the door and having an inner vertical flange depending behind said track bar, a plurality of casings having flanges overlapping and bolted to the outer face of the door, the chambered portions of said casings being arranged within recesses in the lower edge of the door above the horizontal portion of said Z-shaped retaining member, and rollers mounted in said chambered portions and engaging said track bar.

7. The combination with a car body having a door opening, a floor portion projecting through said door opening beyond the side of the car and a sliding door the lower edge of which overlaps said projecting floor portion, of a track bar beneath said door secured to and spaced from the side of the car, a Z-shaped retaining member secured to the lower edge of the door and having a horizontal portion extending inwardly beneath said projecting floor portion and provided with an inner flange depending into the space behind said track bar, casings having flanged portions overlapping and bolted to the outer face of the door and chambered portions arranged in recesses in the lower edge of the door above the horizontal portion of said retaining member, and rollers mounted in said chambered portions and extending downwardly below the horizontal portion of said retaining member into engagement with said track bar.

JOSEPH F. COMEE.

Witnesses:
GEO. P. FISHER,
J. G. ANDERSON.